United States Patent
Sahin et al.

(10) Patent No.: US 12,514,890 B2
(45) Date of Patent: Jan. 6, 2026

(54) PLANT EXOSOMES USED FOR TREATMENT OF DISEASES ORIGINATING FROM PROTEIN AGGREGATES FORMED IN CELLS

(71) Applicant: YEDITEPE UNIVERSITESI, Istanbul (TR)

(72) Inventors: Fikrettin Sahin, Istanbul (TR); Oguz Kaan Kirbas, Istanbul (TR); Batuhan Turhan Bozkurt, Istanbul (TR); Pakize Neslihan Tasli, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 856 days.

(21) Appl. No.: 17/631,967

(22) PCT Filed: Jul. 30, 2020

(86) PCT No.: PCT/TR2020/050677
§ 371 (c)(1),
(2) Date: Feb. 1, 2022

(87) PCT Pub. No.: WO2021/021063
PCT Pub. Date: Feb. 4, 2021

(65) Prior Publication Data
US 2022/0288146 A1 Sep. 15, 2022

(30) Foreign Application Priority Data
Aug. 1, 2019 (TR) .................................. 2019/11667

(51) Int. Cl.
*A61P 25/28* (2006.01)
*A61K 36/185* (2006.01)

(52) U.S. Cl.
CPC ............ *A61K 36/185* (2013.01); *A61P 25/28* (2018.01)

(58) Field of Classification Search
None
See application file for complete search history.

(56) References Cited

U.S. PATENT DOCUMENTS

| 2013/0209528 A1 | 8/2013 | Levi et al. |
| 2017/0035700 A1* | 2/2017 | Zhang ................ A61K 31/353 |
| 2017/0307638 A1 | 10/2017 | Kang et al. |
| 2019/0160097 A1 | 5/2019 | Pusic et al. |

FOREIGN PATENT DOCUMENTS

| EP | 1165789 A2 | 1/2002 |
| EP | 2756847 A1 | 7/2014 |
| WO | 2016033696 A1 | 3/2016 |
| WO | 2018039119 A1 | 3/2018 |
| WO | 2018102397 A1 | 6/2018 |
| WO | 2018107061 A1 | 6/2018 |

OTHER PUBLICATIONS

Wang Q, Zhuang X, Mu J, et al. Delivery of therapeutic agents by nanoparticles made of grapefruit-derived lipids [published correction appears in Nat Commun. 2013;4:2358. (Year: 2013).*
Pardridge WM. Treatment of Alzheimer's Disease and Blood-Brain Barrier Drug Delivery. Pharmaceuticals (Basel). 2020;13(11):394. Published Nov. 16, 2020. doi:10.3390/ph13110394 (Year: 2020).*
Burns C, and Wickware C. Degenerative neurological disorders. The pharmaceutical Journal. 2024 (Year: 2024).*
Abrami L, Brandi L, Moayeri M, et al. Hijacking multivesicular bodies enables long-term and exosome-mediated long-distance action of anthrax toxin. Cell Rep. 2013;5(4):986-996. doi:10.1016/j.celrep.2013.10.019 (Year: 2013).*
FDA. Public Safety Notification on Exosome Products. (Year: 2019).*
Zhuang X, Teng Y, Samykutty A, et al. Grapefruit-derived Nanovectors Delivering Therapeutic miR17 Through an Intranasal Route Inhibit Brain Tumor Progression. Mol Ther. 2016;24(1):96-105. doi:10.1038/mt.2015.188 (Year: 2016).*
A. Chiò, et al., Global Epidemiology of Amyotrophic Lateral Sclerosis: A Systematic Review of the Published Literature, Neuroepidemiology, 2013, pp. 118-130, vol. 41.
Matthew C Kiernan, et al., Amyotrophic lateral sclerosis, Lancet, 2011, pp. 942-955, vol. 377.
Lewis P. Rowland, et al., Amyotrophic Lateral Sclerosis, The New England Journal of Medicine, 2001, pp. 1688-1700, vol. 344, No. 22.
H. D Durham, et al., Aggregation of Mutant Cu/Zn Superoxide Dismutase Proteins in a Culture Model of ALS, Journal of Neuropathology & Experimental Neurology, 1997, pp. 523-530, vol. 56, No. 5.
Celeste M. Karch, et al., Role of mutant SOD1 disulfide oxidation and aggregation in the pathogenesis of familial ALS, PNAS, 2009, pp. 7774-7779, vol. 106, No. 19.
Don W. Cleveland, et al., Oxidation versus aggregation—how do SOD1 mutants cause ALS?, Nature Medicine, 2000, pp. 1320-1321, vol. 6, No. 12.
Alvaro G. Estevez, et al., Induction of Nitric Oxide-Dependent Apoptosis in Motor Neurons by Zinc-Deficient Superoxide Dismutase, Science, 1999, pp. 2498-2500, vol. 286, No. 5449.
Allison Beach, et al., Exosomes: an overview of biogenesis, composition and role in ovarian cancer, Journal of Ovarian Research, 2014, pp. 1-10, vol. 7, No. 14.
Anna-Kristin Ludwig, et al., Exosomes: Small vesicles participating in intercellular communication, The International Journal of Biochemistry & Cell Biology, 2012, pp. 11-15, vol. 44.

(Continued)

*Primary Examiner* — Tracy Vivlemore
*Assistant Examiner* — Fatimah Khalaf Matalkah
(74) *Attorney, Agent, or Firm* — Bayramoglu Law Offices LLC

(57) ABSTRACT

Plant exosomes can be used to reduce the protein aggregates formed in the cells and the damage they cause to the cells. Plant exosomes are of plant origin and not transgenic, and thus, they are reliable as an alternative to the drugs used in the treatment of neurodegenerative diseases, particularly ALS. Moreover, compared to the conventional applications, plant exosomes can provide a product with high efficacy and no side effects which can be produced in high amounts and at affordable prices due to the fact that it is plant-derived.

7 Claims, 4 Drawing Sheets

(56) References Cited

OTHER PUBLICATIONS

Nunzio Iraci, et al., Focus on Extracellular Vesicles: Physiological Role and Signalling Properties of Extracellular Membrane Vesicles, Int. J. Mol. Sci, 2016, pp. 1-32, vol. 17, No. 171.
B. Stegmayr, et al., Promotive Effect on Human Sperm Progressive Motility by Prostasomes, Urol Res, 1982, pp. 253-257, vol. 10.
Stefania Raimondo, et al., Citrus limon-derived nanovesicles inhibit cancer cell proliferation and suppress CML kenograft growth by inducing TRAIL-mediated cell death, Oncotarget, 2015, pp. 19514-19527, vol. 6, No. 23.

\* cited by examiner

PLANT EXOSOMES USED FOR TREATMENT OF DISEASES ORIGINATING FROM PROTEIN AGGREGATES FORMED IN CELLS

CROSS REFERENCE TO THE RELATED APPLICATIONS

This application is the national phase entry of International Application No. PCT/TR2020/050677, filed on Jul. 30, 2020, which is based upon and claims priority to Turkish Patent Application No. 2019/11667, filed on Aug. 1, 2019, the entire contents of which are incorporated herein by reference.

TECHNICAL FIELD

The present invention relates to use of plant exosomes for reducing the protein aggregates formed in cells and the damage they cause to the cell.

BACKGROUND

Amyotrophic lateral sclerosis (ALS) is a disease which causes loss of motor neurons that enable movement of the voluntary muscles, and which results in muscular atrophy and stroke. According to the studies conducted, incidence rate of ALS worldwide is 2.7 in 1,000,000 people (*Neuroepidemiology* 2013, 41:118-130). Onset of the first symptoms of the disease is seen at ages of 45-70 years. Symptoms progress with loss of abilities of movement, writing and speaking and results with death as a result of respiratory failure due to stroke. The patient is lost within an average of two to five years after diagnosis of the disease (*The Lancet* 2011, 377:942-955).

The disease of 90% of the ALS patients appears to be sporadic and independent from hereditary reasons. The remaining cases are named as familial ALS and it occurs as a result of inheritance of the genetic mutations, 13 of which have been determined with the studies conducted up to the present, from patents to their children. Among these genes, superoxide dismutase 1 (SOD1) mutations are seen in 20% of the hereditary ALS cases and in 5% of the cases which are believed to be sporadic (*New England Journal of Medicine* 2001, 344:1688-1700).

It is known that antioxidants play an important role in the process of ALS disease. SOD1 gene encodes an enzyme that serves as an antioxidant. The mutant SOD1 produced as a result of a mutation folds differently (misfolds) from its healthy form, causing protein aggregates that result in death of neurons (*Journal of Neuropathology & Experimental Neurology* 1997, 56:523-530; *Proceedings of the National Academy of Sciences* 2009, 106:7774-7779; *Nature Medicine* 2000, 6:1320). Other studies have indicated that the mutant form of the gene causes oxidative damage, leading to apoptosis in motor neurons and thus ALS (*Science* 1999, 286:2498-2500). Drugs that inhibit production of the mutant SOD1 enzyme and reduce oxidative damage for the treatment of ALS have been shown to be effective in slowing down the disease process.

Mammalian cells include small vesicular structures called exosomes. When these exosomes are isolated from healthy cells, they can be used to restore the cells, which are damaged or under a certain stress and which cannot complete their self-regeneration, back to their earlier healthy state (*Journal of Ovarian Research* 2014, 7:14). Recently, use of the stem cells in cell-based therapies is also one of the most promising studies. It is asserted that use of the exosomes released from these cells will have positive effects on wound healing and hair growth/strengthening in clinical application (U.S. patent application Ser. No. 13/879,905).

The vesicles are small sacs which are involved in the transport and storage of substances within the cell and are separated by at least one lipid bilayer from the cytoplasm fluid. Exosomes are vesicles, which are released by many organisms from prokaryotes to high eukaryotes and plants, and which contain lipid bilayer vesicles of different sizes (*The International Journal of Biochemistry & Cell Biology* 2012, 44 (1): 11-15). The importance of these vesicles lies behind the capacity of transferring information to the other cells in order to influence the cell function. Signal transfer via exosomes is carried out by means of biomolecules in many different categories consisting of proteins, lipids, nucleic acid and sugars (*The International Journal of Molecular Sciences* 2016, 17 (2): 171).

Functional interactions of extracellular vesicles with cells were first found in 1982 upon determining experimentally that vesicles isolated from seminal plasma increase sperm motility (*Urological Research* 1982, 10 (5): 253-257). From this point on, studies have been conducted in many different tissues until today on the developments related to the molecular mechanism of vesicles and bringing the issues left in the dark into light.

Although there is no study conducted on cells regarding the viability and hair growth stimulation effects of the plant exosomes related to the aggregates formed in the cells, the characterization of the plant exosomes and their effects on cancer cells have begun to be studied (*Oncotarget* 2015, 6 (23): 19514-19527.

The drugs used in the treatment of ALS are intended to reduce the symptoms of the patients and extending their lives. These drugs have serious side effects, and their efficacies are low. Two of the most commonly used drugs are given below:

Edavore (Radicava): This antioxidant, which is administered intravenously, is intended to prevent neuron damage. The effect of the drug on ALS is not fully known. Its side effects are bruises on the body, gait disorders and headaches.

Riluzole (Rilutek): This orally administered drug systemically reduces the glutamate levels in the body. It causes stomach disorders, dizziness and bruises on the body.

The International patent application document no. WO2018102397, an application known in the state of the art, discloses use of exosomes for delivery of therapeutic agents. Microvesicles are produced from many types of cells, and among these there are also plant cells. The therapeutic agent-loaded exosomes of the said invention are used for treating or lessening the severity of various diseases, wherein one of these diseases is amyotrophic lateral sclerosis (ALS). The patent application no. WO2018102397 involves use of different exosomes for delivery of another drug. The therapeutic effect is not provided by the exosomes but by the drug that they carry.

The International patent application document no. WO2016033696, an application known in the state of the art, discloses a method of producing and using exosomes and bio-engineered exosomes. Exosomes may be obtained from non-mammalian cells and the term non-mammalian cells encompass exosomes from plants and vegetables. One of the fields in which exosomes are used is treatment of metabolic syndrome in mammals and one of these metabolic syndromes is amyotrophic lateral sclerosis (ALS). The patent application document no. WO2016033696 discloses about collection of the exosomes produced by individuals after exercise within 4 hours post-exercise. Exosomes are produced with a cargo specific to the source from which they are obtained, the type of cell they are produced from, and the state of stimulation and stress that the said cell experience at that time, and they act according to the said cargo. The said study claims the exosomes at the conditions that they have specified.

The United States patent application document no. US20170307638, an application known in the state of the art, discloses a method for body fluid-based neurodegenerative disease diagnosis through high-sensitive immunoassay of aggregated proteins by photooxidation-induced amplification. Within the scope of the method of the said invention, during preparing the body fluid sample, the process steps of extracting exosomes from a body fluid, isolating neuronal exosomes from the said extracted exosomes or lysing the exosomes to prepare a sample to be analyzed are performed. Neuronal dysfunction may be induced by toxic and easily aggregable proteins and a plurality of neurological diseases are characterized by such a condition. One of these diseases is amyotrophic lateral sclerosis (ALS) disease. The said invention is for diagnosing individuals with neurodegenerative diseases by the aggregate proteins within the exosomes produced by their neurons.

European patent application document no. EP1165789, one of the state of the art applications, discloses vesicle associated proteins (VEAS) and methods for diagnosing, treating or preventing disorders associated with expression of VEAS. One of the diseases aimed to be treated or prevented within the scope of the said invention is amyotrophic lateral sclerosis (ALS) disease. Similar to the previously mentioned patent application, the invention disclosed is completely for diagnosing purposes. In the said document, exosomes obtained from the paint himself/herself is used for diagnosing purposes.

European patent application document numbered EP2756847, one of the state of the art applications, discloses a therapeutic agent for prevention or treatment of Alzheimer's disease. This therapeutic agent contains membrane vesicles (exosomes) of adipose tissue-derived mesenchymal stem cells, and the membrane vesicles (exosomes) contain neprilysin. These neprilysin-containing membrane vesicles (exosomes) degrade amyloid-β as a pathogenic protein of Alzheimer's disease. When these exosomes are administered to the brains of Alzheimer's disease model mice, the generation of amyloid-β is inhibited. The said patent application document makes use of adipose stem cell-derived exosomes. The reason for selecting the adipose stem cells as the source is that these exosomes contain neprilysin protein that degrades amyloid plaques. One of the factors affecting the exosome cargo is the cell type. No exosome can the same with another exosome. The differences of their cargoes allow each one of them to show different results. While adipose cell exosomes will not show the effects of our plant exosomes on aggregate proteins in the same way, the plant exosomes may not show this effect exhibited by adipose exosomes either.

SUMMARY

The objective of the present invention is to eliminate the aggregates by applying exosomes thereby using them for treatment of neurodegenerative diseases such as ALS which are caused by the protein aggregates formed in cells. (The decrease in the aggregates is shown in FIG. 1).

Another objective of the present invention is to provide a drug with high efficacy and no side effects which can be produced in high amounts and at affordable prices due to the fact that it is plant-derived.

BRIEF DESCRIPTION OF THE DRAWINGS

"Plant exosomes used for treatment of diseases originating from protein aggregates formed in cells" developed to fulfill the objective of the present invention is illustrated in the accompanying figures wherein.

DETAILED DESCRIPTION OF THE EMBODIMENTS

The present invention relates to use of plant exosomes for treatment of the diseases caused by the protein aggregates formed in cells. Neurodegenerative diseases such as amyotrophic lateral sclerosis (ALS) disease can be expressed among these diseases. Within the scope of the invention, the plant exosomes are used alone, and the plant exosomes themselves reduce aggregate proteins.

The upper values of protein aggregation, i.e., aggregate formation, are the values that occur when MG132, Verapamil and Bafilomycin are applied, and are toxic to cells. The lower value is specified as Control in FIG. 1, that is, it shows the healthy cell. Likewise, it is seen in FIG. 1 that when different concentrations of exosomes are applied, aggregates, i.e., protein aggregation, significantly decrease.

Figure 1:
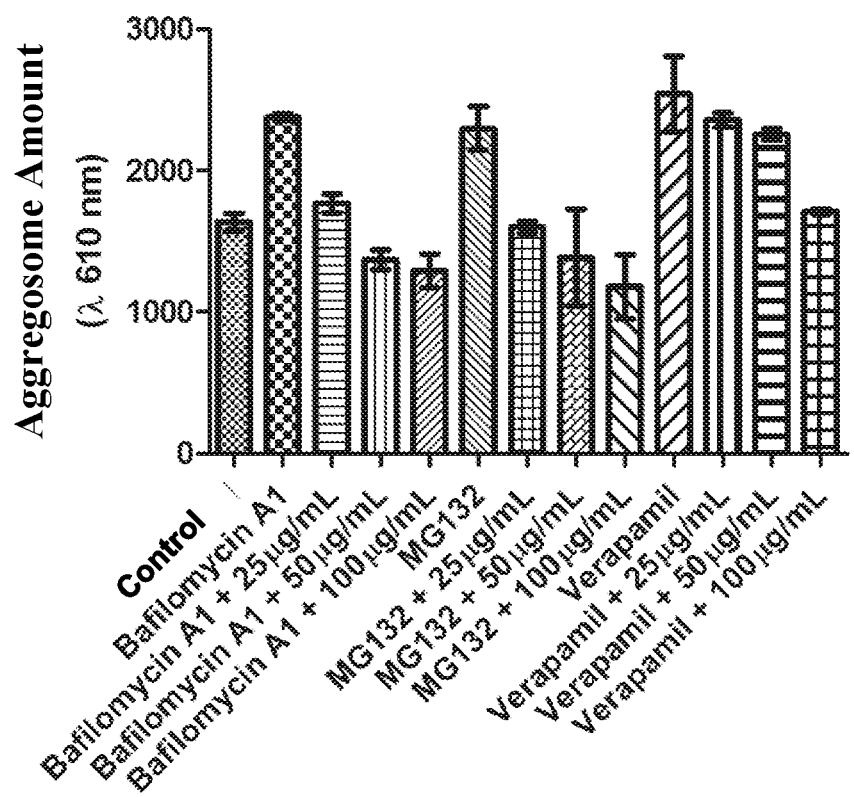
FIG. 1 is a graphical representation of the effect of the Pomegranate exosome applied in different doses to cells, in which aggregates are formed by applying Bafilomycin A1, Verapamil and MG132, on aggregate formation.
Figure 2:
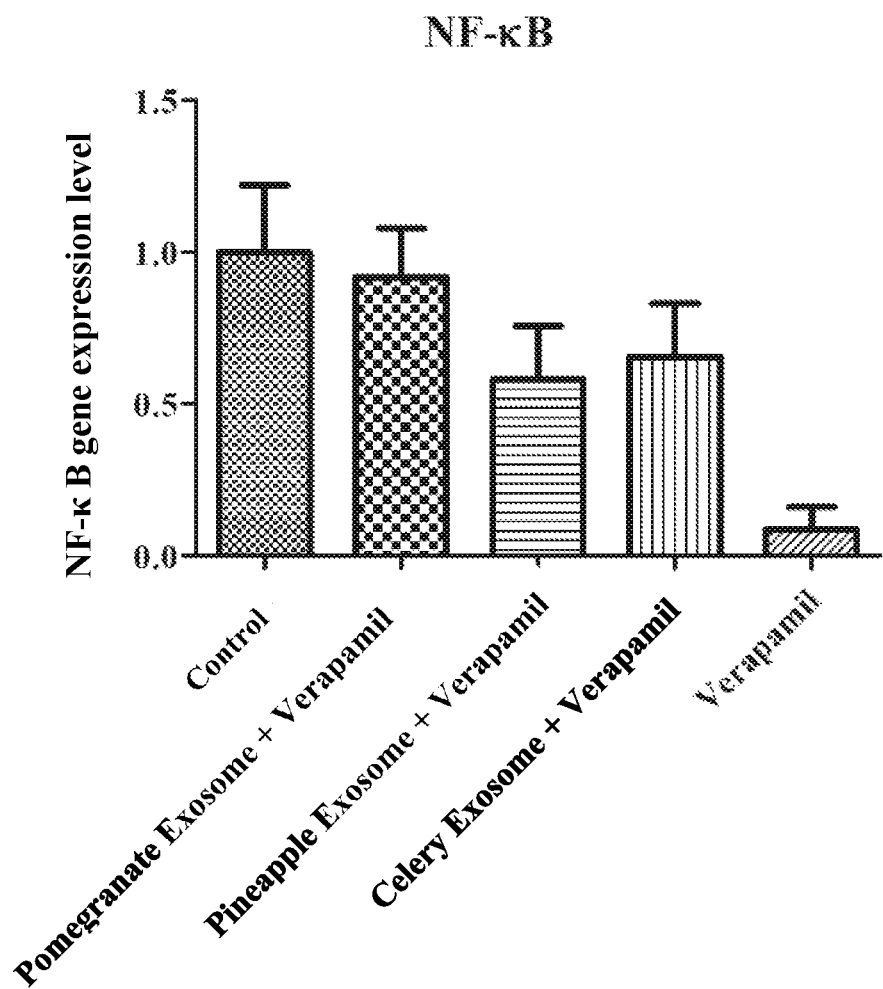
FIG. 2 is a graphical representation of the changes in the expression levels of the NF-kB gene of Pomegranate, Pineapple and Celery exosomes involved in aggregate breakdown upon application of Verapamil.
Figure 3A:
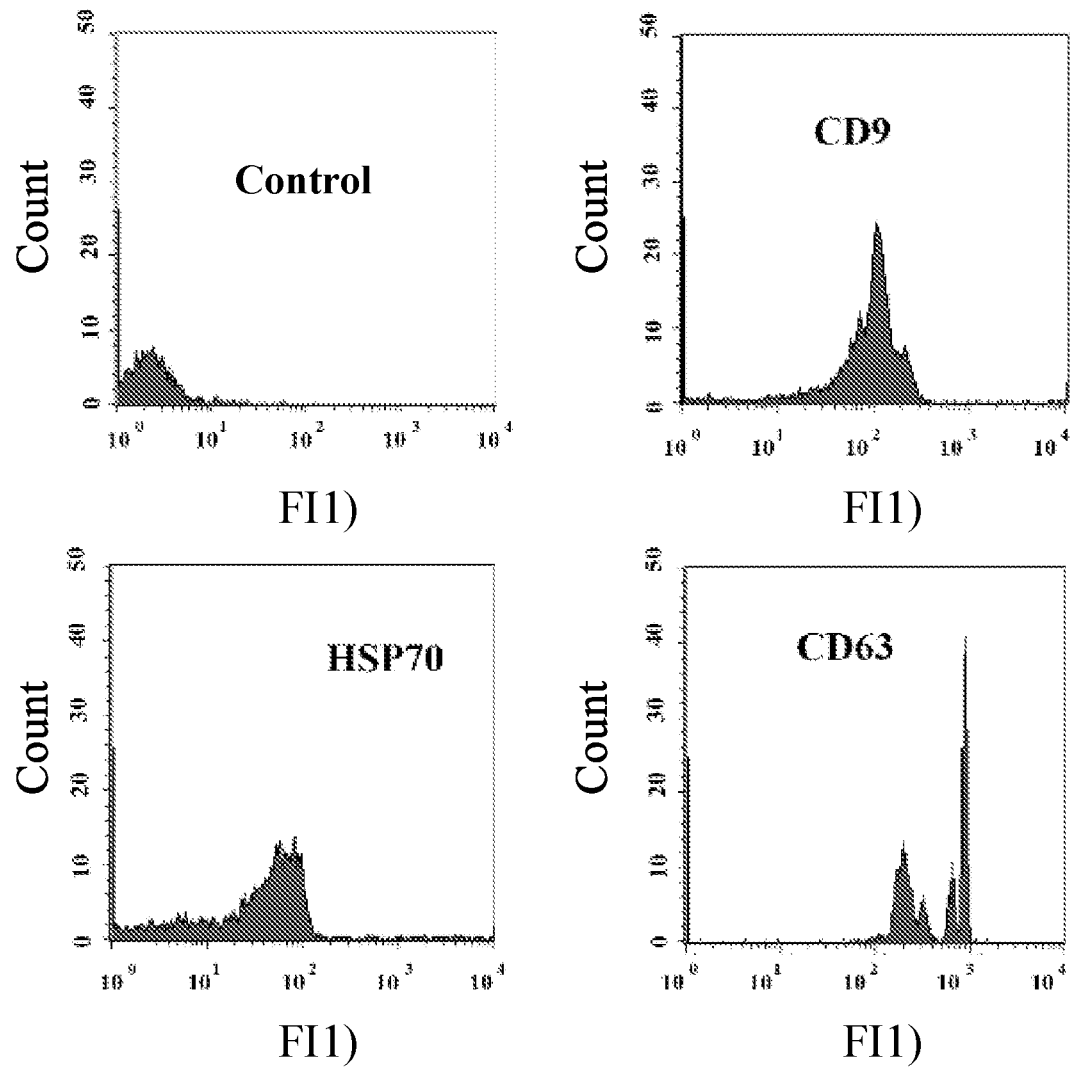
FIG. 3A shows graphical representations demonstrating by flow cytometry that the obtained plant exosomes and characterization of their size distributions is positive for CD9, HSP70 and CD63 markers.
Figure 3B:
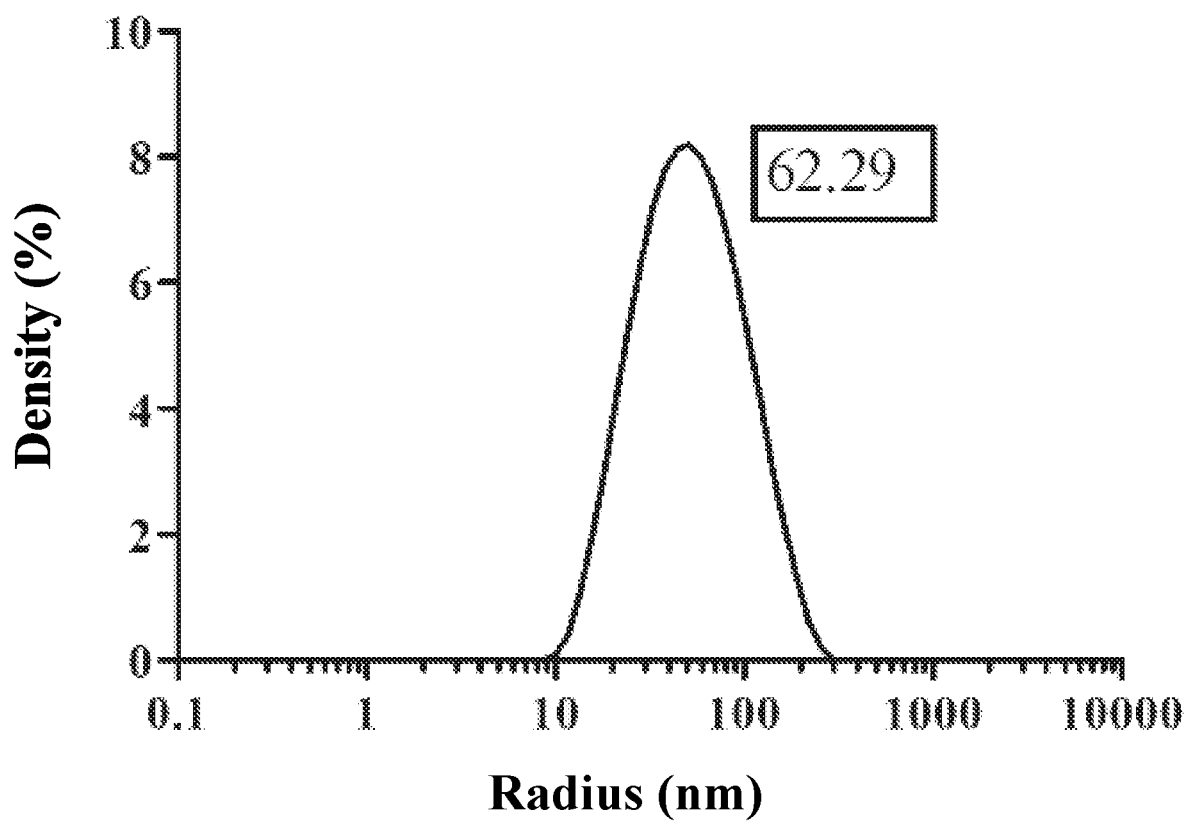
FIG. 3B shows a graphical representation of the size distribution of the exosomes.

Effective doses of the plant exosomes included within the scope of the invention are shown in FIGS. 1 and 2. For living organisms, these effective dose values may differ according to the age, weight and gender of the patient. As can be understood from these figures, the Aggregosome Amount gradually decreases with the increase in the amount of exosome (Pomegranate) (25, 50 and 100 μg/mL) applied to the cells, in which aggregates are formed by applying Bafilomycin A1, Verapamil and MG132. Furthermore, although these exosomes can be used in different combinations, a range of use has been determined. As can be seen in the figures as well, the effects of the plant exosomes required to remove the aggregates from the cells were determined according to the results of the aggregate measurement tests shown in FIG. 1. In FIG. 2, it is shown that not only Pomegranate but also other plants can serve for the breakdown of aggregates. Plant exosomes obtained by isolating from at least one of Pomegranate, Pineapple and Celery plants are used within the scope of the invention (as can be seen in FIG. 2). In one embodiment of the invention, plant exosomes are used at effective doses within exosome value ranges of 10 μg-1 mg for treatment of the diseases caused by protein aggregates formed in cells. Some of the diseases caused by the said protein aggregation are as follows:

Alzheimer's, Parkinson's, Huntington's, Amyotrophic Lateral Sclerosis (ALS) and prion diseases.

The effect levels of the plant exosomes included within the scope of the invention may vary depending on the plant parts from which the exosome will be isolated. While these can be the entire plant, fruit, leaf, seed, and root, they may also be differentiated tissues like the plant's culture medium, stem cell, waste material, shell, or phloem. The plant exosomes can be isolated by many methods such as isolation by two phase separation, graduated centrifuge, ultrafiltration, chromatographic methods, polymer-based isolation and isolation by microbeads. The preparation steps for the isolation method with two phase liquid system that enables the purest exosome isolation are as follows: The large size particles resulting from plant disintegration by centrifugation performed between 2,000 g and 10,000 g for 5-20 minutes for isolation of exosomes from plant lysate are intended not to cause any impurities in the dextran phase upon precipitating due to the centrifugation applied during the two-phase separation process and their weights. In addition, it is ensured that the filter, which is used during the filtration process carried out for removing particles sized 220 nanometers and above, is not clogged. A two-phase fluid system is recommended to be used for separating the homogeneous exosome-protein mixture obtained as a result of the preparation steps. Exosomes are cleared of non-exosomal proteins, cellular fats, and other impurities by utilizing the chemical tendency of the PEG phase to the proteins and the DEX phase to the phospholipid structured membranes in the two-phase liquid system. The DEX phase formed by means of the concentrations of the polymers that are used in the solution separate the exosomes. The isolated exosomes are marked by the surface markers CD9, CD63 and HSP70 antibodies which are carried by the exosomes and the exosomes carrying these markers are measured by flow cytometry device. At the same time, the dimensions of the isolated exosomes are measured by Zeta Sizer (Malvern Zetasizer ZS) device (FIGS. 1, 2, 3A and 3B 1-3).

As the subject matter of the invention is "use of plant exosomes for reducing the protein aggregates formed in cells and the damage they cause to the cell", in the process of developing the invention, the aggregates of plant exosomes that can form aggregates in the biological system on the cells were examined through 3 different pathways. Bafilomycin A1 was used to represent the aggregates formed due to disturbances in energy metabolism. Verapamil was used to represent the aggregation caused by disruption of calcium channels. MG132 represents the aggregation related to damage and malfunctioning of proteases involved in aggregate breakdown. Although aggregation occurs in the cells due to causes such as stress, aging, radiation, accumulation of chemicals, the emergence of aggregate mechanisms can be mimicked with these 3 chemicals that are used.

Within the scope of the invention, in order to determine the effects of plant exosomes on aggregation, the amounts of aggregates were measured, and gene level analyses were performed. The method, which is used in the detection of these aggregates after aggregates are formed in the cells via application of Verapamil, MG132 and Bafilomycin, is as follows:

1. The media of the cells are removed and washed twice with 200 µl 1×PBS. (Approximately 200 µl is sufficient to cover a surface area of 1 cm².)
2. PBS is carefully removed and cells are fixed with 200 µl 4% Paraformaldehyde solution for 30 minutes at room temperature.
3. After removing the 4% Paraformaldehyde solution, the cells are washed twice with 200 µl PBS.
4. After PBS is removed, the cells are incubated on ice for 30 minutes with a solution containing 0.5% Triton X-100, 3 mM EDTA (pH 8) in order to increase the permeability of the membrane.
5. After being washed twice with PBS, the cells are incubated with 200 µl detection solution (1 µl Proteostate aggregation dye, 2 µl Hoechst 33342) for 30 minutes in the dark.
6. After incubation, the cells are washed with 200 µl PBS and then covered on cover glass with adhesive solution.
7. The stained cells were analyzed under confocal microscope (40× magnification). Texas Red filter is used for imaging cell aggregates and DAPI filter is used for detection of cell nuclei.

In the process of developing the invention, the expression levels of the NFB gene were also measured in order to determine the mechanism of the exosomes causing breakdown of the aggregates in the cell. Cultured cells may lose their own properties and acquire new properties. These properties may be both in morphological level and gene expression level. Real Time PCR method was applied to observe the changes in gene expression level. Total RNAs were isolated and cDNA was synthesized from the cells that were seeded in 6-well culture plates (Corning Glasswork, Corning, NY) at 50,000 cells/well in Dulbecco's modified Eagle's medium (DMEM). The synthesized cDNAs were mixed with primers in Fermentas Maxima SYBR Green mixture product such that the final volume will be 20 µl and the expression levels of the genes were analyzed by using BIO-RAD device.

Thanks to use of plant exosomes for reducing the protein aggregates formed in cells and the damage they cause to the cell within the scope of the invention, a drug which has high efficacy and no side effects, and which can be produced in high volumes and at affordable prices can be provided. Moreover, thanks to the fact that this drug is of plant origin and not transgenic, a reliable product with affordable prices is offered.

What is claimed is:

1. A method of reducing protein aggregates formed in cells, comprising the step of administering plant exosomes to the cells in vitro; wherein the protein aggregates formed in the cells are associated with a neurodegenerative disease; and wherein the neurodegenerative disease is at least one selected from the group consisting of: Alzheimer's disease, Parkinson's disease, Huntington's disease, Amyotrophic Lateral Sclerosis (ALS) disease, and prion disease.

2. The method according to claim 1, wherein the neurodegenerative disease is the Amyotrophic Lateral Sclerosis (ALS) disease.

3. The method according to claim 1, wherein the plant exosomes are administered at an effective dose within an exosome value range of 10 µg-1 mg.

4. The method according to claim 1, wherein the plant exosomes are obtained by an isolation from at least one plant selected from the group consisting of a pomegranate plant, a pineapple plant, and a celery plant.

5. The method according to claim 1, wherein the plant exosomes are obtained upon an isolation from at least one plant material selected from the group consisting of an entire plant, a fruit, a leaf, a seed, a root, a plant culture medium, a stem cell, a waste material, a shell, and a phloem.

6. The method according to claim 5, wherein the plant exosomes are obtained upon the isolation from the plant material by at least one isolation method selected from the group consisting of two-phase separation, graduated centrifuge, ultrafiltration, chromatographic methods, polymer-based isolation, and isolation by microbeads.

7. The method according to claim 4, wherein the plant exosomes are obtained upon the isolation from at least one plant material selected from the group consisting of an entire plant, a fruit, a leaf, a seed, a root, a plant culture medium, a stem cell, a waste material, a shell, and a phloem.

* * * * *